Oct. 6, 1964   F. C. BRESK ETAL   3,151,856
HERMETICALLY SEALED LIQUID SPRINGS
Filed May 25, 1961   2 Sheets-Sheet 1

INVENTORS
FRANK C. BRESK
ROBERT P. GRAY
MELBOURNE A. LIPP
BY

*Leon F. Herbert*
ATTORNEY

Oct. 6, 1964  F. C. BRESK ETAL  3,151,856
HERMETICALLY SEALED LIQUID SPRINGS
Filed May 25, 1961  2 Sheets-Sheet 2

INVENTORS
FRANK C. BRESK
ROBERT P. GRAY
BY  MELBOURNE A. LIPP

Leon F. Herbert
ATTORNEY

United States Patent Office 3,151,856
Patented Oct. 6, 1964

3,151,856
HERMETICALLY SEALED LIQUID SPRINGS
Frank C. Bresk and Robert P. Gray, Carmel Valley, and Melbourne A. Lipp, Pebble Beach, Calif., assignors to Monterey Research Laboratory, Inc., Monterey, Calif., a corporation of California
Filed May 25, 1961, Ser. No. 112,693
12 Claims. (Cl. 267—64)

This invention relates to liquid springs and more particularly to means for sealing the high pressure chambers of such springs.

It is now well known that the compressibility of liquids can be utilized to provide a spring action by means of a device called a "liquid spring." The conventional liquid spring compresses a cylinder and piston arrangement in which the piston rod extends through an extremely tight packing in the end of the cylinder. The devices operate on the principle that when the piston rod is moved into the cylinder the liquid volume will be decreased, thus compressing the liquid and storing energy in it. Liquid springs, as distinguished from hydraulic shock absorbers and damping devices, are relatively high pressure devices and operate with pressures up to 50,000 p.s.i. or more in the cylinder.

Accordingly, one of the major problems in liquid springs is that of sealing the piston rod. In the past this has been accomplished by the use of extremely high pressure packing arrangements. These of course resulted in undesirably high friction, and even the most advanced designs tend to develop leaks after a period of continued use.

One of the objects of this invention is to provide a liquid spring which will not leak even after prolonged use or infinite passage of time.

Another object of the invention is to provide a liquid spring having a relatively low-friction seal between the end of the cylinder and the piston rod.

An additional object of the invention is to provide a liquid spring in which the sealing means also serves to provide a static spring characteristic for the device.

A further object of the invention is to achieve the preceding objectives in a liquid spring in which the piston rod extends through both ends of the cylinder. This type of liquid spring is particularly useful where it is necessary to have a strong and therefore large diameter piston rod connected to the load and at the same time it is necessary that a relatively long travel of the piston rod will result in relatively small change in the liquid volume in the cylinder. This type of liquid spring is achieved by using a piston rod having a large diameter end and a smaller diameter end. Each end of the piston rod extends through the adjacent end of the cylinder so that only the difference between the cross sectional areas of the two rod ends is instrumental in changing the fluid volume in the cylinder as a result of axial movement of the piston rod.

Another object of the invention is to achieve the objectives of non-leakage, low friction and the static spring feature in a double-acting liquid spring.

A still further object is to provide a liquid spring in which the restoring or spring force of the liquid is effective to resist shock loading but will not prevent the cylinder and piston from being completely telescoped as a result of continued static load of predetermined magnitude. One use for such a device would be in connection with fighting forest fires where it would be desirable to drop equipment to the fire fighters from aircraft. The device of the invention will oscillate to absorb the shock of initial impact and then slowly deform to place the equipment in solid contact with the ground.

An additional object of the invention is to provide a liquid spring which can be stored in closed position with low internal pressure and when released will restore itself to the proper expanded position for use in a suspension system.

By way of brief description the invention is based on the concept of providing a very small fluid passage across the seal between the end of the cylinder and the piston rod. In the past it was felt that this seal must be completely closed. According to the invention, however, the liquid spring characteristics of the device are retained insofar as dynamic shock loading is concerned even though a small fluid passage is provided across the piston rod seal. At the same time the pressure drop across such a restricted passage is such that the outside hermetic enclosure for the device need only handle relatively low pressure fluid. Thus, the piston rod seal can, for example, be a conventional labyrinth seal without any packing. In view of the restrictive nature of the passage across the seal, a finite time is required for appreciable fluid passage across the seal to the outside of the cylinder, and such fluid will arrive outside the cylinder at relatively low pressure. Therefore, the outer side of the seal can be hermetically closed by a metal bellows attached to the piston rod and the outer end of the cylinder. However, one further feature is required and that relates to the pressure in the bellows chamber. Since the chamber is completely filled with liquid, high pressure therein will be quickly developed as the chamber contracts on inward movement of the piston rod. For example, metal bellows capable of accommodating a 4–6 inch piston stroke must have such thin wall thickness that they will burst at pressures not much above 150 p.s.i. Therefore the invention also includes means for preventing the build up of high pressure in the bellows chamber.

Other objects and features of advantage, together with the foregoing, will be apparent from the following description of the invention when read in connection with the drawings. The invention is not limited to the disclosed embodiments but includes the various embodiments thereof within the scope of the appended claims.

Figure 1:
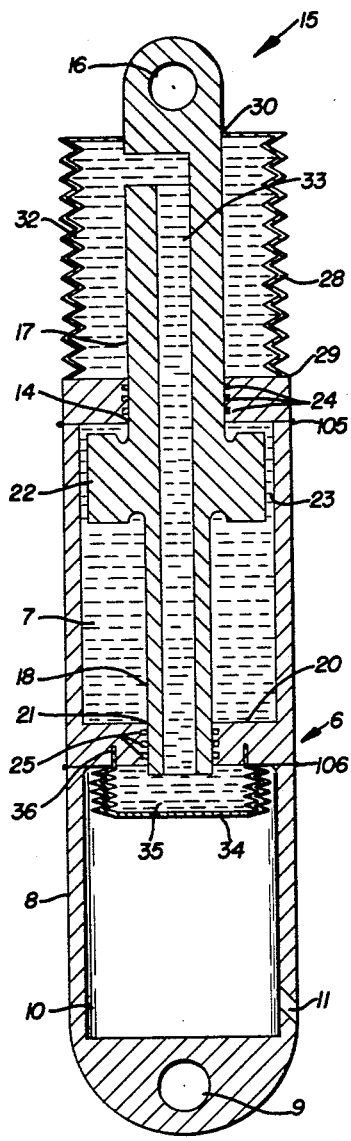
FIGURE 1 is a longitudinal section of a compression-type liquid spring employing a double ended piston rod.

Referring in more detail to the drawings FIGURE 1 shows a liquid spring according to the invention comprising a cylindrical hollow body 6 forming a high pressure chamber 7. Body member 6 includes an extension 8 for attachment in the overall system (not shown) by means of eye 9. In the particular construction of FIGURE 1, the extension 8 forms a compartment 10 which is preferably vented to the atmosphere by port 11 for reasons to be hereinafter described.

The upper end of body member 6 has a bore 14 therethrough. A piston rod indicated generally at 15 is slidingly sealed in the bore and is provided with an eye 16 for connection to the system. Piston rod 15 is made in two different diameters, an upper large diameter end 17 and a lower small diameter end 18. High pressure chamber 7 has a lower end wall 20 forming a partition between chamber 7 and compartment 10. Wall 20 has a bore 21 in which the small end 18 of the piston rod is sealed. As a result of the two diameter piston rod a very versatile design is achieved. Thus the load bearing end 17 can be made as large as necessary for stretch and at the same time substantial inward travel of the piston rod can be accommodated before maximum pressure is attained in chamber 7. If end 18 were removed from the piston rod, then change in volume in chamber 7 would be a function of piston travel times the cross-section area of end 17; whereas with the two-diameter piston rod the change in volume is a function of piston travel times the difference between the cross-section area of ends 17 and 18. The utility of the device is increased by the addition of a damping head 22 which is appropriately spaced from the wall of chamber 7 to provide an annular damping orifice 23 giving the device the desired damping characteristics. Chamber 7 is of course completely filled with a liquid, preferably a silicone liquid of the type normally used in liquid springs.

The nature of the seal between the bore 14 and piston rod end 17 is an important aspect of the invention. Regardless of specific design, the seal must be sufficiently restrictive to permit the fluid in chamber 7 to be compressed when the piston rod moves into the chamber under shock load. Normally, the spring effect of liquid is not realized at pressures much below 5000 p.s.i and the effect is utilized at pressures even greater than 50,000 p.s.i. Thus, it will be understood that the seal must be substantially restrictive. At the same time the seal must provide a pasageway which will permit liquid to pass from chamber 7 when the piston rod moves into the chamber under static load. Obviously, some fluid will pass through the seal when the piston rod moves under shock load as well as under static load, the critical aspect being that fluid must not pass so freely through the seal that the device will not build up spring pressures in the fluid under shock loading of the magnitude for which it is designed.

The preferred form of seal is a labyrinth seal comprising a close fit between the bore and the piston rod and a plurality of annular grooves 24 containing spring liquid to "float" the piston rod portion 17. The clearance between the bore 14 and the rod portion 17 is of course another design parameter which can be changed to change the characteristics of the device. However, the clearance must be relatively small to achieve the build up of desired spring pressure; for example a clearance of about two ten thousandths of an inch is suggested as one design. The preceding discussion regarding the seal at bore 14 applies also to bore 21 which is provided with grooves 25.

In conventional liquid springs made prior to this invention, the seal at bores 14 and 21 does not provide any liquid passage and as a result has complicated designs involving packing materials. In addition the extremely high friction in the prior art seals limits the sensitivity and usefulness of the device. Further, the conventional liquid spring is unable to provide the "set-down" function described in connection with the invention. As distinguished from the conventional liquid sprng, this invention involves a very simple seal which does not require any packing means. Even grooves 24 and 25 are not mandatory. Further, the new seal is relatively frictionless. In addition the new passage type seal enables a liquid spring to set its load down after the usual shock load oscillations have subsided and the static load continues over a period of time. Also the new type seal now makes it possible to have a really leak proof, really hermetically sealed, long life liquid spring. The seal is used in combination with a bellows arrangement which will now be described.

A deformable wall 28 is sealed to the end of body member 6 and to the piston rod 15 so that the device is not closed by a sliding seal and therefore does not suffer from the previously described deficiencies of conventional sliding seal liquid springs. In order to obtain full benefit from the structure, the deformable wall 28 is a metal bellows welded or brazed to body 6 and rod 15 at seams 29 and 30, respectively. An important aspect of the invention is the provision of means for preventing high pressure from building up in the bellows when the piston rod moves inwardly. It will be realized that as the piston rod moves into pressure chamber 7, liquid will be forced out of the pressure chamber across the seal at bore 14 even during shock loading. However, the pressure drop across the restricted passage provided by the seal results in the liquid entering the low pressure, or bellows, chamber 32 at relatively low pressure. The pressure problem in bellows chamber 32 is caused by the fact that when the piston rod moves inwardly, two actions tend to increase the pressure in chamber 32. Liquid is added to chamber 32 from chamber 7 and also the volume of chamber 32 decreases. Deformable walls in general and metal bellows walls in particular cannot withstand high pressure. Therefore, means in the form of passageway 33 in the piston rod and a metal bellows 34 in compartment 10 are provided to maintain low pressure in chamber 32 when the piston rod moves inwardly. Bellows 34 forms a non-sliding hermetic seal across the sliding seal at bore 21. The bellows is preferably attached by a permanent metal bond as by brazing its end in the annular groove 36. Compartment 10 is vented at 11 to permit bellows 34 to expand and contract freely. The entire space in the liquid spring is completely filled with liquid. Thus, chambers 7, 32 and 35 are filled, as well as passage 33 and grooves 24 and 25.

In operation the liquid spring described in connection with FIGURE 1 operates in the following manner. FIGURE 1 shows the device in its normal or extended position. At the start of motion due to shock loading the damping head 22 is rapidly accelerated to high velocity relative to the cylinder body 6. Liquid is forced to flow around the head through damping orifice 23. This causes a damping force which is proportional to the velocity between the damping head and cylinder body. In addition, the inward movement of the piston rod 15 causes the fluid volume in chamber 7 to decrease because of the difference in the diameters of rod ends 17 and 18, resulting in an increase in the average liquid pressure in chamber 7. Leakage from the high pressure chamber 7 to the low pressure bellows chambers 32 and 35 is negligible for short time periods due to the restrictive nature of the seals at the bores 14 and 21. Thus the liquid in chamber 7 is compressed and contributes a spring force or restoring force on the rod 15, tending to force the rod back out of the cylinder body. Another result of inward movement of rod 15 is to compress bellows 28 causing the liquid therein to be forced into the expansion bellows 34. Since the flow passage 33 connecting the two bellows chambers is quite large, very little pressure is built up in bellows chamber 32 and the pressure in that chamber is thus maintained at a safe low value. If the load is held for a relatively long time period (that is, becomes a static load) liquid will flow from the high pressure chamber 7 across the seals at bores 14 and 21 into the low pressure chambers 32 and 35. This flow allows the unit to stroke slowly to its mechanical limit.

Figure 2:
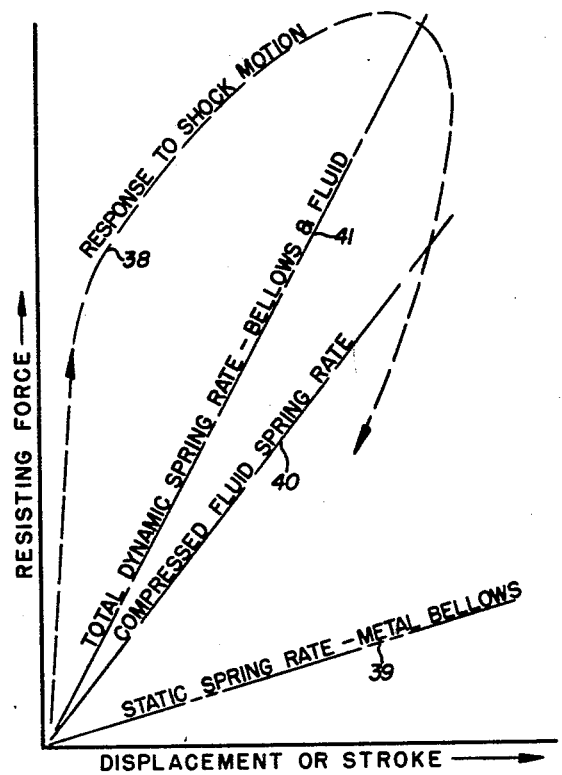
FIGURE 2 is a graph of piston displacement versus resisting force which presents a qualitative illustration of the action of the device.

In FIGURE 2 the line 38 labeled "response to shock motion" presents a graphic illustration of the motion and forces previously described. In addition FIGURE 2 illustrates another feature of the invention; namely, the use of sealing means 28 and 34 to provide a spring characteristic which can be utilized as a means for supporting static loads of selected magnitude. Static loads of greater magnitude will of course cause the piston rod to stroke inwardly until a positive mechanical limit is reached, as by the supported object coming into contact with the ground or the lower side of damping head coming to rest against wall 20. In addition the spring function of the bellows 28 can be used to center the device or return it to normal or extended position after removal of a prolonged static load. FIGURE 2 shows for a typical device the relative spring characteristics of the metal bellows, compressed fluid, and the two combined, lines 39, 40 and 41 respectively.

Figure 3:
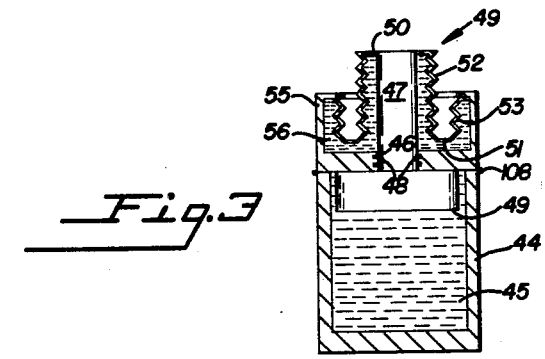
FIGURE 3 is a longitudinal section of a compression-type spring employing a single ended piston rod.
Figure 5:
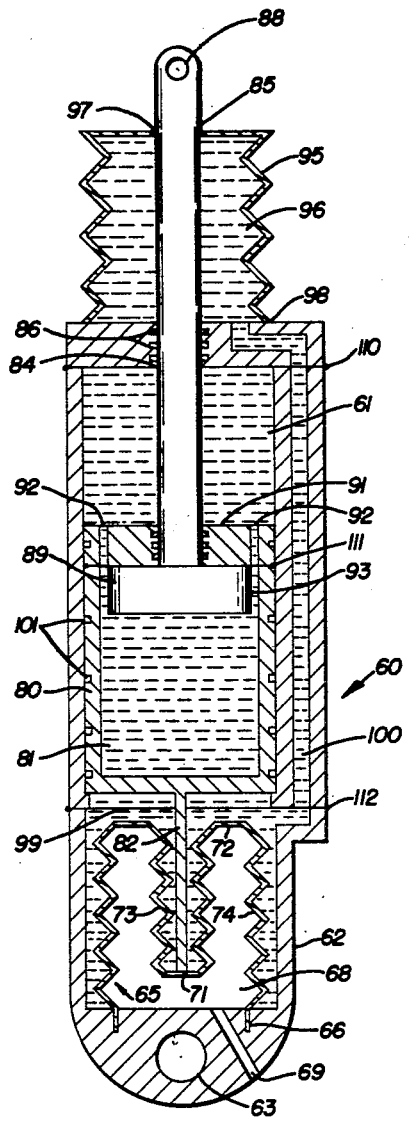
FIGURE 5 is a longitudinal section of a double-acting liquid spring embodying features of the invention.
Figure 4:
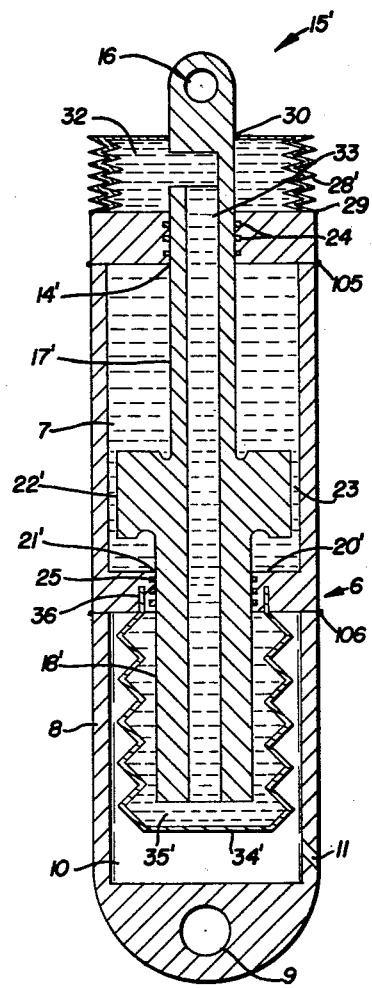
FIGURE 4 is a longitudinal section of a tension-type liquid spring employing a double ended piston rod.

Various features of the invention can be embodied in other structures than FIGURE 1. Some of the possible modifications are shown in FIGURES 3, 4, and 5. FIGURE 3 shows a modified compression-type liquid spring in its expanded or normal position. The unit comprises a cylinder body 44 providing a compression chamber 45 closed at its lower end and having a bore 46 at its upper end. A piston rod 47 is sealed in bore 46 by means of a labyrinth seal involving annular grooves 48 as described for FIGURE 1. A damping head 49 is provided on rod 47 and functions in the same manner as head 22 in FIGURE 1. The main difference between FIGURES 1 and 3 is that FIGURE 3 does not have a two-diameter piston rod. Accordingly, FIGURE 3 does not have a bellows 34 as in FIGURE 1, and some other means is required for maintaining low pressure in the bellows indicated generally at 49. The means used is a metal, one-piece, double bellows; that is, a bellows having two axially movable end walls and two radially spaced side walls. Thus bellows 49 has center and wall 50, annular end wall 51, inner side wall 52 and outer side wall 53. End wall 50 is brazed to the end of piston rod 47 and the end of side wall 53 is brazed to the end of a cylindrical extension 55 on body 44. When piston rod 47 moves inwardly tending to compress the low pressure chamber 56 in the bellows, end 51 is free to move outwardly to keep the volume of chamber 56 substantially unchanged. All of the space in the device of FIGURE 3 is filled with liquid as in the case of FIGURE 1.

FIGURE 4 shows a tension type liquid spring which is very similar to FIGURE 1. Elements in FIGURE 4 which are exactly the same in shape and function as their counterpart in FIGURE 1 are given the same reference numeral. Elements which differ in any way are given primed reference numerals and their differences will now be explained. In essence FIGURE 4 operates in reverse of FIGURE 1. Thus in FIGURE 4, piston rod area 17' is small and area 18' is large so that the liquid in chamber 7 is compressed when piston rod 15' moves outwardly. FIGURE 4 shows the device in its contracted or normal position. In operation a load will move piston 15' outwardly, carrying with it bellows 28'. Thus low pressure chamber 32' is enlarged, rather than reduced as in FIGURE 1. Bellows 34', however, is extended in the normal position and contracts in operation. Thus the contracting chamber 35' will supply fluid to the expanding chamber 32' through passage 33. Bores 14' and 21' are small and large respectively, in opposite manner from FIGURE 1 but the seals across the bores are exactly the same. Piston rod 15' carries a damping head 22' which functions the same as head 22 in FIGURE 1 except that head 22' contacts the top of the cylinder at maximum stroke instead of partition 20'.

FIGURE 5 shows a double-acting liquid spring comprising a cylinder body 60 having a high pressure chamber 61. An extension, or lower end, 62 of the cylinder body is provided with an eye 63 for connection in the system (not shown). A metal, one piece, double bellows 65 is located in extension 62 with the end of the bellows brazed in annular groove 66. Bellows 65, together with the end wall of extension 62, forms a compartment 68 which is vented to the atmosphere through port 69 so that the bellows can expand and contract freely. The bellows has a central end wall 71, an annular end wall 72 at the other end, inner side wall 73 and outer side wall 74. A second cylinder body 80 is located inside cylinder body 60, with a close sliding fit between the outer wall of body 80 and the inner wall of body 60. Cylinder body 80 provides a high pressure chamber 81 and has a projection 82 on its lower end brazed to bellows wall 71. The upper end of cylinder body 60 has a bore 84 which receives a piston rod 85. The seal between bore 84 and rod 85 is designed exactly as explained for bores 14 and 21 in FIGURE 1, and in the preferred embodiment bore 84 is provided with labyrinth seal grooves 86. Piston rod 85 is provided at its upper end with an eye 88 for connection to the system. The lower end of the piston rod carries a damping head 89 which also serves as an abutment which engages the upper end wall 91 on cylinder body 80 to move body 80 upon upward movement of the piston rod. Wall 91 is provided with ports 92 which interconnect chambers 61 and 81 for reasons which will be hereinafter explained. An annular damping orifice 93 is provided between damping head 89 and cylinder body 80. The size of orifice 93 can of course be changed to obtain the desired damping characteristics. A metal bellows 95 provides a hermetic seal at the upper end of the cylinder body 60 and forms a low pressure chamber 96. Bellows 95 is brazed or welded to the piston rod at seam 97 and to body 60 at seam 98. The double bellows 65 forms a low pressure chamber 99 which is connected to chamber 96 by passageway 100.

FIGURE 5 shows the double-acting liquid spring in its normal position, and the operation of the device will now be described. When the device is subjected to a compression load, piston rod 85 moves inwardly. This does not change the volume of chamber 61 but it does decrease the volume of chamber 81. As the piston rod moves inwardly there are two damping effects; one resulting from restricted liquid flow through orifice 93 and the other from restricted flow through ports 92. Inward movement of the piston also increases the average pressure in chamber 81 and, because of ports 92, also increases the pressure in chamber 61. This increase in average pressure provides the liquid spring action. Prolonged static loading will cause piston rod 85 to stroke slowly to its mechanical limit as liquid passes slowly across the seal at bore 84 and into low pressure chamber 96. The pressure in chamber 96 is maintained low because of the unrestricted flow through passage 100 to chamber 99 which can easily expand by downward movement of wall 72. When the liquid spring of FIGURE 5 is subjected to a tension load, piston rod 85 moves outwardly. This causes cylinder body 80 to be moved upwardly due to the abutment between damping head 89 and wall 91. The close fit between cylinder bodies 60 and 80 is designed to provide a seal which is approximately of the same restriction as the seal at bore 84, and labyrinth seal grooves 101 are preferably provided around the outside of body 80.

Thus, the upward movement of cylinder body 80 will compress liquid in chamber 61 to provide the liquid spring action. It will be understood that the change in volume of chamber 61 is a function of the difference in cross-section area of the outwardly moving piston rod 85 and upwardly moving body 80. Accordingly the action of the device in tension can be modified as desired by changing the relative cross-section areas of piston rod 85 and cylinder body 80. Obviously, the relative actions in compression and tension can also be varied by changing the relative cross-section areas of piston rod 85 and cylinder body 80. Damping action is achieved by virtue of flow through damping ports 92. Prolonged static loading will cause piston rod 85, and with it cylinder body 80, to move slowly upwardly to a positive mechanical limit as liquid passes slowly across the seal at bore 84 and between cylinder bodies 60 and 80. Bellows wall 71 will be moved upwardly by extension 82; bellows 95 will be expanded by movement of piston 85; and the pressure in bellows chambers 96 and 99 will be maintained at a safe level by means of flow through passage 100 and by means of movement of free wall 72 on bellows 65.

In order to facilitate manufacture of the devices, the body members 6, 44, 60, and 80 are all made of several separate pieces which, after insertion of the internal parts, are joined together at the welded or brazed seams designated at 105, 106 in FIGURES 1 and 4; 108 in FIGURE 2; and 110, 111 and 112 in FIGURE 5. A possible alternative arrangement would be to thread the separate parts and screw them together. However, it would be desirable to seal the threaded joints by brazing in order to preserve the premanent hermetic seal feature of the invention. The body member of each of the devices is of course provided with a fill port and plug (not shown), and the fill plug is preferably brazed in place after all of the chambers and passageway are completely filled.

It will be understood by those skilled in the art that the side walls of chambers 7, 45, and 81 can be tapered or otherwise programmed so that the width of the damping annulus varies with axial position of the damping head. For example, the walls can be tapered so that the width of the damping annulus decreases as the piston rod moves in to compress the liquid. Thus, as the piston rod moves along its stroke, and therefore decreases in velocity, the width of the damping annulus will decrease to provide a greater ratio of damping force to piston rod velocity.

Although the invention is primarily concerned with deformable devices which are completely filled with liquid and therefore develop very high internal pressures, it will be understood that several features of the invention might be applied to various types of deformable devices for suspension systems.

Having thus described the invention what is claimed as new and desired to be secured by Letters Patent is as follows:

1. A deformable device for a suspension system, said device comprising a hollow body providing a first chamber therein, opposite end walls of said chamber each having a bore therethrough, a piston rod passing through said chamber and slidingly sealed in both of said bores, said piston rod having a large diameter portion received in one of said bores and a smaller diameter portion received in the other of said bores, a deformable wall hermetically attached to the outside of one end of said hollow body and one end of said piston rod to form a second chamber, wall means outside the other end of said hollow body and forming a third chamber, said wall means forming a hermetic seal across the bore at the other end of said piston rod, and a passageway other than said first chamber interconnecting said second and third chambers.

2. A deformable device for a suspension system, said device comprising a hollow body providing a first chamber therein, opposite end walls of said chamber each having a bore therethrough, a piston rod passing through said chamber and slidingly sealed in both of said bores, said piston rod having a large diameter portion received in one of said bores and a smaller diameter portion received in the other of said bores, a first bellows hermetically sealed to the outside of one end of said hollow body and one end of said piston rod to form a second chamber, a second bellows hermetically sealed across the other end of said hollow body and forming a third chamber, said second bellows forming a hermetic seal across the bore at the other end of said piston rod, and a passageway other than said first chamber interconnecting said second and third chambers.

3. A device as claimed in claim 2 in which said first bellows is sealed to the large diameter end of said piston rod.

4. A device as claimed in claim 2 in which said first bellows is sealed to the smaller diameter end of said piston rod.

5. A device as claimed in claim 2 in which said passageway is in said piston rod.

6. A device as claimed in claim 2 in which a damping head is carried by said piston rod inside said first chamber.

7. A device as claimed in claim 2 in which said seals between said piston rod and said bores are sufficiently restrictive to permit fluid in said first chamber to be compressed when said large diameter portion of the piston moves into said first chamber under shock load, and said seals providing a sufficient fluid passage to permit fluid to pass from said first chamber to said second and third chambers when said large diameter portion of the piston rod moves into said first chamber under static load, the passages formed by said seals each being more restricted than said passageway interconnecting said second and third chambers.

8. A liquid spring comprising a hollow body providing a high pressure chamber therein, opposite end walls of said chamber each having a bore therethrough, a piston rod passing through said chamber and slidingly sealed in both of said bores, said piston rod having a large diameter portion received in one of said bores and a smaller diameter portion received in the other of said bores, a first bellows hermetically sealed to the outside of one end said hollow body and the adjacent end of said piston rod to form a first low pressure chamber, a second bellows hermetically sealed across the outside of other end of said hollow body and forming a second low pressure chamber, said second bellows forming a hermetic seal across the bore at the other end of said piston rod, said piston rod having a passageway therein interconnecting said low pressure chambers, said seals between said piston rod and said bores being sufficiently restrictive to permit liquid in said high pressure chamber to be compressed when said large diameter portion of the piston moves into said high pressure chamber under shock load, and said seals providing a sufficient liquid passage to permit liquid to pass from said high pressure chamber to both said low pressure chambers when said large diameter portion of the piston rod moves into said high pressure chamber under static load.

9. A liquid spring comprising a hollow body providing a high pressure first chamber therein, the wall of said chamber having a bore therethrough, a piston rod slidingly sealed in said bore for axial movement therethrough, a bellows hermetically bonded to the outside of said hollow body and said piston rod to form a low pressure second chamber containing said piston rod, said piston rod and said high pressure chamber being so shaped that movement of said piston rod into said high pressure chamber changes the volume of said high pressure chamber, a damping head on said piston rod in said high pressure chamber and providing a liquid flow passage from one side of the head to the other side of the head, non-gaseous compressible liquid completely filling said high and low pressure chambers, said seal between said piston rod and said bore being sufficiently restrictive to permit the fluid in said high pressure chamber to be compressed when said piston rod moves under shock load in a direction to decrease the volume of said high pressure chamber, and said seal providing a sufficient liquid passage to permit liquid to pass from said high pressure chamber to said low pressure chamber when said piston rod moves under static load in a direction to decrease the volume of said high pressure chamber, said passage across said damping head being less restricted than the passage across said seal, and means for maintaining low pressure in said low pressure chamber when said bellows is deformed as a result of movement of said piston rod in a direction to decrease the volume of said low pressure chamber, said means for maintaining low pressure comprising a third chamber having a deformable wall, and said means for maintaining low pressure further comprising a passageway other than said high pressure chamber connecting said low pressure chamber and said third chamber, and said passageway providing a less restricted passage than the passage across said seal.

10. A liquid spring comprising a hollow body providing a high pressure chamber therein, the wall of said chamber having a bore therethrough, a piston rod slidingly sealed in said bore for axial movement therethrough, said rod and said high pressure chamber being so shaped that movement of said piston rod into said high pressure chamber changes the volume of said high pressure chamber, said seal between said piston rod and said bore being sufficiently restrictive to permit liquid in said high pressure chamber to be compressed when said piston rod moves under shock load in a direction to decrease the volume of said high pressure chamber, and said seal providing a sufficient liquid passage to permit liquid to pass from said high pressure chamber to said low pressure chamber when said piston rod moves under static load in a direction to decrease the volume of said high pressure chamber, and double acting deformable wall means forming a hermetically sealed envelope extending between said body and the outside end of said piston rod, said double acting means comprising two deformable walls and a passageway other than said high pressure chamber connecting said deformable walls, and said passageway providing a less restricted passage than the passage across said seal.

11. A liquid spring as claimed in claim 10 in which one end of said high pressure chamber is formed by a second hollow body slidingly sealed in the first mentioned hollow body, said piston rod being received through one end of said second hollow body and having an abutment thereon inside said second hollow body, and a partition wall on said one end of said second hollow body and engageable by said abutment.

12. A liquid spring as claimed in claim 10 in which said two deformable walls comprise a generally cylindrical bellows-shaped outer wall, a generally cylindrical bellows-shaped inner wall inside said outer wall, and an annular end wall connecting one end of said inner wall to one end of said outer wall.

References Cited in the file of this patent

UNITED STATES PATENTS

| | | |
|---|---|---|
| 2,212,259 | Binder | Aug. 20, 1940 |
| 2,919,883 | Murphy | Jan. 5, 1960 |
| 2,936,860 | Peras | May 17, 1960 |
| 3,074,708 | Lush et al. | Jan. 22, 1963 |

FOREIGN PATENTS

| | | |
|---|---|---|
| 811,382 | France | Apr. 13, 1937 |
| 812,993 | France | May 21, 1937 |